(12) United States Patent
Anand et al.

(10) Patent No.: US 8,892,539 B2
(45) Date of Patent: Nov. 18, 2014

(54) BUILDING, REUSING AND MANAGING AUTHORED CONTENT FOR INCIDENT MANAGEMENT

(71) Applicant: International Business Machines Corporation, Armonk, NY (US)

(72) Inventors: Rangachari Anand, Teaneck, NJ (US); Juhnyoung Lee, Yorktown Heights, NY (US); Rong Liu, Sterling, VA (US); Kohtaroh Miyamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 13/687,725

(22) Filed: Nov. 28, 2012

(65) Prior Publication Data

US 2014/0149411 A1 May 29, 2014

(51) Int. Cl.
*G06F 17/30* (2006.01)

(52) U.S. Cl.
CPC .... *G06F 17/30705* (2013.01); *G06F 17/30654* (2013.01)
USPC .......................................................... 707/705

(58) Field of Classification Search
USPC ............. 707/E17.068, 999.001–999.009, 705
See application file for complete search history.

(56) References Cited

U.S. PATENT DOCUMENTS

| | | | |
|---|---|---|---|
| 6,662,357 B1 | 12/2003 | Bowman-Amuah | |
| 7,149,732 B2 * | 12/2006 | Wen et al. | 1/1 |
| 7,523,105 B2 * | 4/2009 | Wen et al. | 1/1 |
| 7,831,688 B2 | 11/2010 | Linyard et al. | |
| 8,028,197 B1 | 9/2011 | Barua et al. | |
| 2003/0050908 A1 | 3/2003 | Kreulen et al. | |
| 2006/0136455 A1 * | 6/2006 | Wen et al. | 707/101 |
| 2007/0144994 A1 * | 6/2007 | Tew | 211/189 |
| 2007/0180107 A1 | 8/2007 | Newton et al. | |
| 2007/0299702 A1 | 12/2007 | Rigdon et al. | |
| 2008/0004991 A1 | 1/2008 | Aikens et al. | |
| 2008/0126163 A1 | 5/2008 | Hogan et al. | |
| 2008/0172263 A1 | 7/2008 | Heyman | |
| 2009/0063125 A1 | 3/2009 | Faisman et al. | |
| 2009/0063234 A1 | 3/2009 | Refsland et al. | |
| 2009/0228579 A1 | 9/2009 | Sanghvi et al. | |
| 2010/0318391 A1 | 12/2010 | Gvirtsman et al. | |
| 2010/0318846 A1 | 12/2010 | Sailer et al. | |
| 2011/0016368 A1 | 1/2011 | Ayachitula et al. | |
| 2011/0113429 A1 | 5/2011 | Oda | |
| 2012/0072781 A1 | 3/2012 | Kini et al. | |
| 2012/0173243 A1 | 7/2012 | Anand et al. | |

OTHER PUBLICATIONS

International Search Report and Written Opinion dated Apr. 24, 2014 issued in PCT/US13/67429.

* cited by examiner

*Primary Examiner* — Baoquoc N To
(74) *Attorney, Agent, or Firm* — Scully, Scott, Murphy & Presser, P.C.; Louis J. Percello, Esq.

(57) ABSTRACT

Building, reusing and calibrating network of authored content, in one aspect, may comprise clustering a plurality of problem tickets into one or more clusters. The clusters may be associated to one or more FAQ nodes in a FAQ network. The associated one or more FAQ nodes may be checked to determine whether the nodes are part of a broken branch. If the one or more FAQ nodes leads to a broken branch, a user may be notified to update the branch, e.g., with an answer or resolution to the one or more FAQ nodes.

19 Claims, 8 Drawing Sheets

TICKET
- ID
- SEVERITY
- CATEGORY
- SUB-CATEGORY
- DESCRIPTION
- TIME TO RESPOND
  ETC.

FIG. 7A

FAQ NETWORK
- FAQ NODES
- CRITICALITY OF BROKEN BRANCH AND ASSOCIATED TICKETS
- ACCESS INFORMATION ASSOCIATED WITH EACH NODE PATH
- FEEDBACK INFORMATION ASSOCIATED WITH EACH NODE PATH

FIG. 7B

CRITICAL FAQ CLUSTERS
- CLUSTER INFORMATION OF TICKETS
- SCORES ASSOCIATED WITH EACH CLUSTER

FIG. 7C

BUILDING, REUSING AND MANAGING AUTHORED CONTENT FOR INCIDENT MANAGEMENT

FIELD

The present application relates generally to computers, and computer applications, and more particularly to information technology (IT) service management and incident management.

BACKGROUND

Customer support workers or the like receive requests or reports for support to fix problems or incidents, e.g., in computer systems, equipments, machinery, and others. The problems or incidents are usually logged or reported into tickets, which may then be presented for resolution to the appropriate workers. Resolution of the tickets pose a challenging task as the customer support workers need to determine the information necessary to solve the problems reported in the tickets, including the type of questions that need to be further posed to the customer in order to resolve the problem.

BRIEF SUMMARY

A method for building, reusing and calibrating network of authored content, in one aspect, may comprise receiving a plurality of problem tickets. The method may also comprise clustering the plurality of problem tickets into one or more clusters. The method may further comprise associating the one or more clusters to one or more frequently asked question (FAQ) nodes in a FAQ network. The method may also comprise determining whether the one or more FAQ nodes is part of a broken branch. The method may further comprise notifying a user of the broken branch.

A system for building, reusing and calibrating network of authored content, in one aspect, may comprise a ticket analyzer operable to determine frequently asked question candidates as content for authoring from a problem ticket description associated with an information technology system. The ticket analyzer may be further operable to progressively refine and refactor an FAQ network comprising the determined frequently asked question candidates as nodes in the FAQ network. The ticket analyzer may be further operable to identify and provide a broken branch, manage FAQ network with criticality of broken branch and associated tickets. An authoring system may allow one or more users to author answers to the frequently asked question candidates. An authored content user portal may be operable to allow the one or more users to locate frequently asked questions in the FAQ network to solve a problem.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIG. 7A shows an example data model (data structure or an object or the like) representing a ticket.

FIG. 7B shows an example data model representing an FAQ network.

FIG. 7C shows an example data model representing critical FAQ clusters.

DETAILED DESCRIPTION

Figure 1:
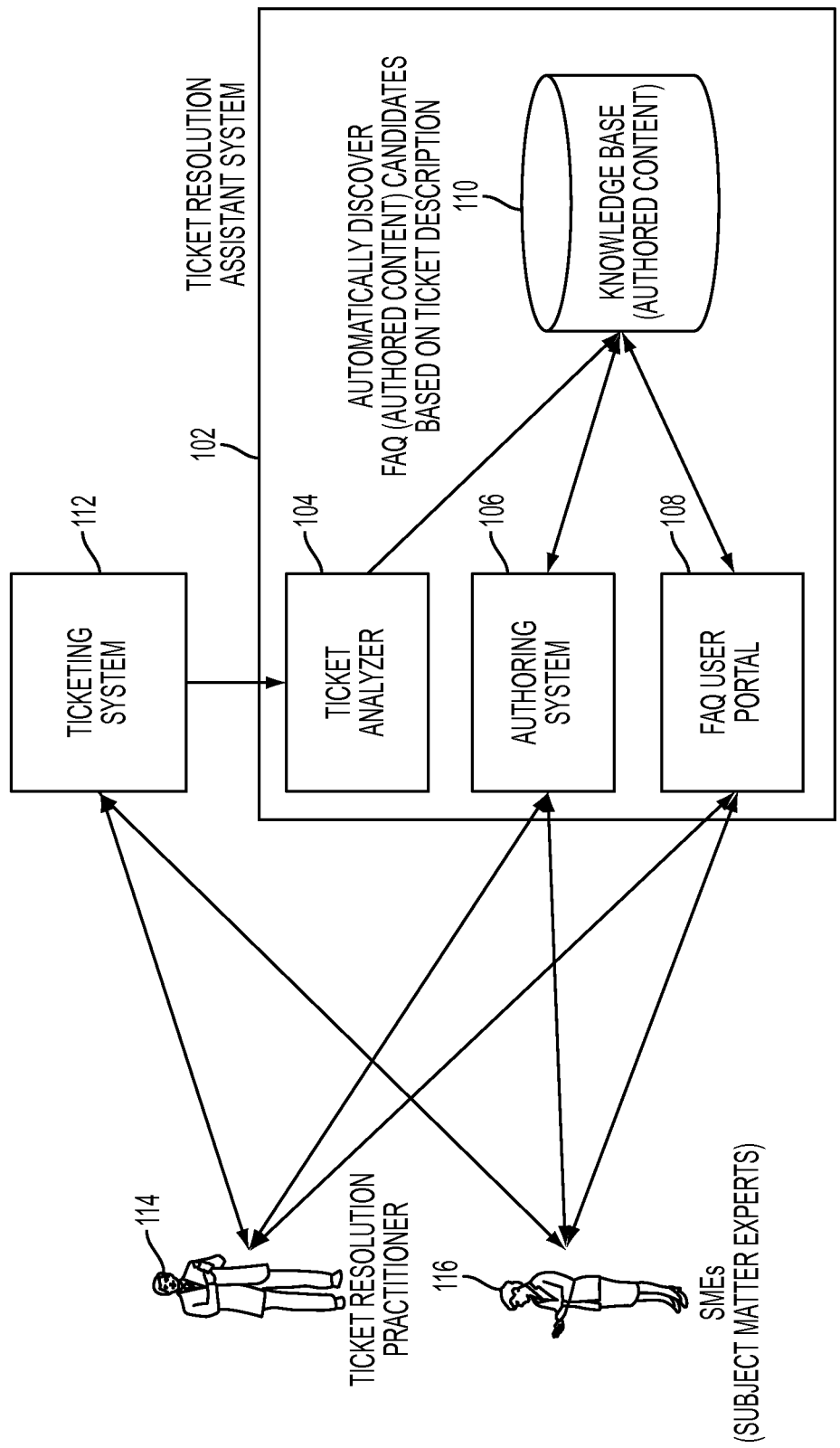
FIG. 1 illustrates a ticket resolution assistant system in one embodiment of the present disclosure.

An approach is disclosed to (1) automating discovery of relevant ticket resolution or authored content (e.g., in the form of frequently asked question (FAQ)) candidates based on incoming ticket description, (2) reusing the authored content in resolving tickets efficiently and effectively, and (3) managing, calibrating and refining the authored content (FAQ) incrementally. In this disclosure, such approach may be referred to in terms of one or more methodologies, and may be embodied as (but not limited to) one or more methods or processes, systems, and/or articles of manufacture. For example, incident or problem ticket description may be analyzed to identify FAQ to determine dialog candidate, then the FAQ may be categorized, e.g., into structured FAQ. For instance, one or more FAQs or series of questions may be identified based on the ticket description, answers to which may lead to the resolution of the ticket. In another aspect, the identified FAQs (or series of questions) may be matched to FAQs in a network of FAQs, uncovering branches in the network that may need updating.

An approach of the present disclosure may utilize a tool, for example, a web-based tool, referred to as a dialog manager, that documents, organizes and reuses procedural knowledge as dialogs. Ticket resolution knowledge may be documented in dialogs by importing knowledge content, e.g., as a network of FAQs, which then may be reused (e.g., searched) in a dialog-based ticket resolution process. Knowledge content may be imported into a network of FAQs, traversal of which may provide dialogs leading to resolution, or conversation thread for resolution. Co-owned U.S. patent application Ser. No. 12/985,050 filed on Jan. 5, 2011 discloses an expert conversation builder, the entire disclosure and content of which is incorporated herein by reference. FAQs and FAQ network of the present disclosure may be implemented into such systems as disclosed in that application.

In one aspect, IT Service Management (ITSM) concerns customer's perspective of IT contribution to the business. Incident Management is an IT service management (ITSM) process area, and may include an objective to restore a normal service operation as quickly as possible and to minimize the impact on business operations, thus ensuring that the best possible levels of service quality and availability are maintained. Incident is any event which is not part of the standard operation of a service and which causes, or may cause, an interruption to or a reduction in, the quality of that service. Information Technology Infrastructure Library (ITIL) may include a set of practices for ITSM that focuses on aligning IT services with the needs of business. ITIL describes procedures, tasks and checklists that are not organization-specific, used by an organization for establishing a minimum level of competency. A stated ITIL objective may be to restore normal operations as quickly as possible with the least possible impact on either the business or the user, at a cost-effective price.

One or more methodologies for building, reusing and managing authored content for incident management in the present disclosure may reduce the number of incident or problem tickets and also the time to resolution (TTR), which will lead to cost savings, for example, to an IT service management provider and also for customers.

Incident management in the present disclosure may include incident detection and recording, categorization of incidents or problems (e.g., logged as tickets) into groups comprising, e.g., application (e.g., service not available, application bug, memory leak), hardware (e.g., system-down, automatic alert, printer not printing), and other causes (e.g., network, dependency on other applications, maintenance, workload). Incident management may also include initial support (referred to as level 1 support), investigation and diagnosis (referred to as cause analysis), resolution and recovery, incident closure, and incident ownership, monitoring, tracking and communication.

Investigation and diagnosis may involve diagnosing and detecting causes of an incident in a data-driven way, e.g., by creating and analyzing concurrent and recurrent problems; discovering patterns in causes and effect problems and capturing them in rules and other forms; and data-driven preventive analysis based on the captured rules to provide warnings on incidents possibly upcoming with instruction for preventive actions.

Resolution and recovery may involve speeding up issue resolution and improving the quality of resolution by providing resolution instruction authored by expert; improving the efficiency of the authored content by identifying "Frequently Asked but Unanswered/Slowly Answered" incidents; facilitating the resolution using the authored instruction by providing the instruction in a dialog as well as in free-text; improving issue resolution process by making dialogs searchable and providing dialogs and free-text instruction side-by-side; calibrating the authored instruction by collecting and analyzing the usage data, e.g., in every step of dialogs; matching an incident (ticket) with the right human resource by creating a dialog network and mapping human resources to nodes in the network by subject matter and skill set.

FIG. 1 illustrates a ticket resolution assistant system in one embodiment of the present disclosure. A ticket (a problem or incident ticket) entered into a ticketing system 112 may be resolved, e.g., by a ticket resolution assistant system 102 that may include components such a ticket analyzer 104, an authoring system 106, FAQ user portal 108 and knowledge base 110. The knowledge base 110 in one aspect may store authored content, for example, authored by a ticket resolution practitioner 114, an SME 116 or the like via the authoring system 106 that enables a user to author or create content, e.g., answers to FAQ.

A ticket, for instance, is submitted by a user when there is an incident or problem in a system. Examples of a ticket/problem may include simple ones such as (1) "I forgot my password, and how can I retrieve it?" (2) "Network does not work in my computer, and how can I fix this." Depending on the nature of the system/application, there may be complex problems that are captured and submitted in tickets. The content authored by SMEs in this context is knowledge on how to fix such problem. For example, "Press CTRL+ALT+DELETE, and then click Change a password. Type your old password, type your new password, type your new password again to confirm it, and then press ENTER." In one aspect, the problem/ticket resolution knowledge can be procedural. The problem/ticket resolution knowledge may be captured, e.g., in text in documents, or in a flow chart form. To provide the knowledge, an FAQ (Frequently Asked Questions) list can be created. The ticket/problem resolution knowledge may be captured in a directed acyclic graph format, and the software may take the nodes one at a time as in a conversation automatically. Support providers may prepare answers to those frequently asked questions, for example, in software editable text documents, and share the list across support personnel so that they can provide standard, readily-available answers quickly.

A ticket from the ticketing system 112 may include description of the incident or problem as well as the information associated with the problem, e.g., the time (timestamp), administrator or user who created the ticket, a system that is having the problem, and other information. The ticket resolution assistant system 102 and the ticketing system 112 and their respective components or modules may run on a hardware processor or processors in one or more computer systems.

The ticket analyzer 104 may analyze (request for information (RFI)) tickets to determine FAQ (content for authoring) candidates. For example, tickets may be submitted to request for information on resolutions of problems. Selecting an FAQ for knowledge capture may involve a level of judgment, e.g., from an SME 116. In one embodiment of the present disclosure, the process may be automated by using a clustering technique or the like. The ticket analyzer 104 streamlines the generation of candidates for FAQ capture in one embodiment of the present disclosure. The ticket analyzer 104 determines from a given ticket, FAQ candidates, whose answers would resolve one or more problems.

An authoring portal or system 106 allows an SME 116/practitioner 114 or the like to author answers to FAQs, the candidates identified by the ticket analyzer 104. In one embodiment of the present disclosure, procedural answers are created in dialog form. Thus, automatically identified FAQs of the present disclosure may be answered by SMEs, practitioners or the like, in one embodiment of the present disclosure. An answer can be developed with progressive refinement and refactoring. In one aspect, dialogs may begin as single nodes and be progressively refined to extend a network of dialogs, which then may be stored dynamically.

For example, SMEs or the like may author the dialog content (problem/ticket resolution knowledge) by using the authoring component 106. SMEs can use his/her subject matter knowledge for authoring the problem resolution dialogs. It may be useful to leverage existing knowledge captured in forms such as FAQs. An SME or the like can use the FAQ as a basis to create problem resolution dialogs. For instance, an SME translates the existing problem knowledge captured in FAQ to one or more problem resolution dialogs which can be shared by multiple users. Materials of dialog authoring such as FAQs may be automatically or semi-automatically translated into problem resolution dialogs.

FAQ (authored content) user portal 108 in one embodiment allows ticket resolution practitioners 114 or the like to locate procedures to solve their problems. The authored content at 108 refers to problem resolution knowledge authored by one or more SMEs (e.g., via 106 as described above). Both dialog based search and text search are made possible in the present disclosure. FAQ user portal 108 also may provide practitioners 114 or the like with social networking features to locate other practitioners with knowledge of procedures.

In one embodiment of the present disclosure, an analysis method of the ticket analyzer 104 may include clustering tickets based on problem description, referred to as "frequently asked questions" (FAQs); and further classifying by cluster size and unresolved tickets (e.g., service level agreement (SLA) misses), referred to as "unanswered or slowly answered questions. Unanswered questions may be identified by attributes such as the timestamp that may indicate the time the ticket is created, assigned and communicated. Slowly answered questions may be identified according to attributes such as time to resolution (TTR) and a predetermined threshold. Clustering techniques may include score-based techniques, which may comprise facet data matching, e.g., according to category, sub-category, type, to analyze general environment or category; text data clustering, e.g., to analyze specific details of symptom; and trend analysis, e.g., scoring the time trend for each cluster to analyze the priority. Clustering techniques may utilize keywords identified in the tickets. Those clustering techniques may be performed or processed in parallel, as well as in series. In example implementations, 16,000-17,000 tickets were analyzed using the ticket analyzer of the present disclosure to cluster and identify FAQ candidates for building and/or refining an FAQ network.

In one embodiment, the facet data matching score Sf of any given 2 tickets t1, t2 is calculated as follows:

$$Sf = \Sigma(w_i * \text{match}(t_{1i}, t_{2i}))$$

where
i is the level of category, e.g., category is 1, sub-category is 2;
$w_i$ is the weight for each level of category, the higher category is usually weighed higher;
match( ) calculates the relevance, e.g., ABC 5 and ABC 6 are similar;
$t_{ji}$ shows the ticket category information for ticket number j category level i.

If facet data matching score Sf is higher than given criteria, the methodology of the present disclosure in one embodiment considers the t1 and t2 to be the same facet category cluster. "Facet" refers to each attribute in the ticket. The above calculation matches each category facet of the pair of given tickets and adds (sums) the scores. The weight is used because not each category level may have the same in weight (or importance or priority). In other words, some category levels may be more meaningful than others.

For tickets in the same facet category, the next step in one embodiment of the present disclosure is to cluster the tickets by its text document (referred to as text data clustering). The methodology of the present disclosure in one embodiment assumes latent Dirichlet allocation where topics and each topic is characterized by a distribution over words. The generative process for each document l is as follows.
1. Choose $\theta l \sim \text{Dir}(\alpha)$, where $l \in \{1, \ldots, M\}$ and $\text{Dir}(\alpha)$ is the Dirichlet distribution for parameter $\alpha$.
2. Choose $\phi k \, \text{Dir}(\beta)$, where $k \in \{1, \ldots, K\}$ and $\phi$ is Markov matrix which denotes the word distribution of a topic.
3. For each of the words wlm, where $m \in \{1, \ldots, Ni\}$
   (a) Choose a topic $zl,m \sim \text{Multinomial}(\theta l)$
   (b) Choose a word $wlm \sim \text{Multinomial}(\phi zl,m)$
where,
M is the number of ticket documents and N is the number of words in a text document,
K is the number of topics, $\alpha$ is the parameter of the Dirichlet prior on the per-document topic distributions,
$\beta$ is the parameter of the Dirichlet prior on the per-topic word distribution,
$\theta l$ is the topic distribution for document l,
$\phi k$ is the word distribution for topic k,
zl,m is the topic for the jth word in document l, and
wl,m is the specific word.

In trend analysis, the trend is analyzed by the slope of number of tickets over time. The trend is mapped to the priority of each cluster. The methodology of the present disclosure in one embodiment obtains approximate straight line by least squares method and calculates its slope.

$$\text{calculated slope} = \arg\min_a \text{trend}(X, Y) = \sum_{i=1}^{n} (yi - (a*xi + b))^2$$

where,
a is the slope, b is the y-intercept,
trend( ) calculates the trend from each ticket occurrence time in cluster,
$X \in (x1, \ldots, xn)$ represents the time axis for each ticket and n is the number time slots,
$Y \in (y1, \ldots, yn)$ represents number of tickets in each time slot.

Figure 2:
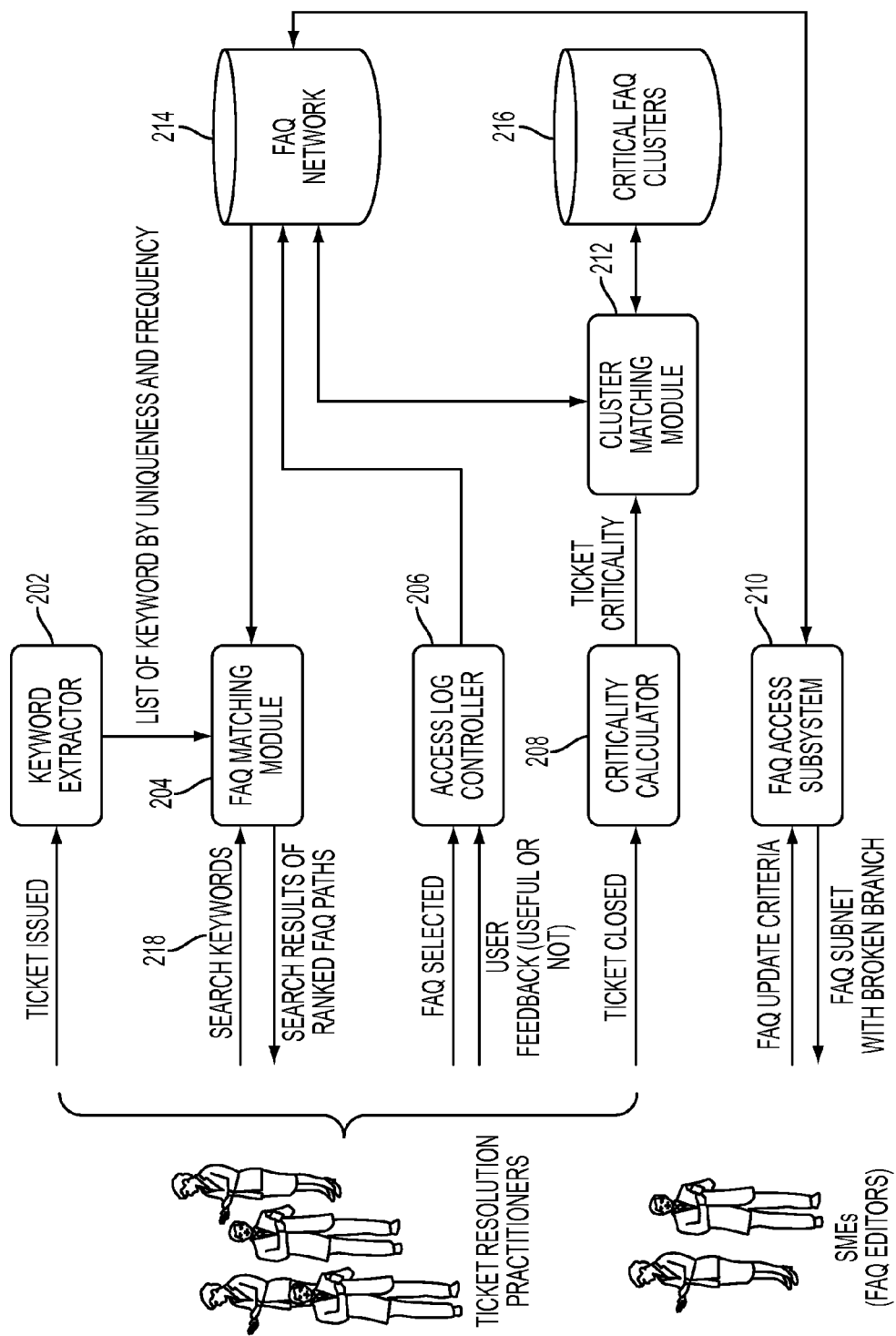
FIG. 2 is a diagram illustrating a use case for FAQ authoring in one embodiment of the present disclosure.

FIG. 2 is a diagram illustrating a use case for FAQ authoring (authoring of problem resolution knowledge/dialogs) in one embodiment of the present disclosure. The modules shown in FIG. 2 may run on one or more hardware processors. FAQ matching module 204 looks for one or more FAQ paths that matches the keywords occurring in a given ticket or keywords received from a user. In one embodiment of the present disclosure, an FAQ matching module 204 obtains the strongest paths of FAQ by calculating the following: keyword matching score between keywords and each FAQ, category match score, if applicable, and access ranking of FAQ. In one aspect, the keyword matching score between keywords and each FAQ is calculated by using depth of node (number of nodes by the shortest path from root) and uniqueness of keyword. In addition, frequency of keyword may be also used, if applicable. Category match score may be calculated by using depth of category. Access ranking of FAQ may be calculated by using a rank by access to FAQ path.

More particularly, for example, the FAQ matching module 204 may calculate a keyword matching score utilizing the following algorithm:
1. for each node ni in FAQ depth of node dni is depth(ni)=arg min uppernodes(ni) and uppernodes( ) counts the number of upper nodes to root;
2. weightscore wdn for each depth of node wdn is weight defined for each level of depth d;
3. for a given path lj consisting nodes can be obtained nljm=nodes(lj);
4. the strongest path of FAQ can be obtained by the path with the highest matching score, max arg match(kj, nodes(lj)) *wdn*dnj, where match returns the matching score based on the uniqueness and frequency. Here, j is index of keyword, kj is each keyword, dnj is the depth of nj, nj is the node being inspected
5. uniqueness of given keyword can be calculated by tf-idf method which can be obtained by tf*idf where tf is the term frequency which is the number of frequencies in the document and idf is the inverse documents frequency which shows the rareness of the word in the FAQ domain.

As another example, the FAQ matching module 204 may calculate a category matching score using the facet data matching score Sf of any given 2 tickets t1, t2: Sf=Σ($w_i$*match($t_{1i}$, $t_{2i}$)) described above.

Yet as another example, the FAQ matching module 204 may calculate an access ranking of FAQ by usage as follows: For each FAQ path the access information of each path or nodes that has each path can be used to score the matching, arg max accessrank(lj), where lj is each node path and the node path which has the highest score of access rank is chosen.

A criticality calculator module 208 may calculate the criticality or priority of the ticket by, e.g., time to respond (TTR), severity, SLA, and/or other factors, e.g., based on ticket attributes. In one aspect, TTR is defined as the Σ(Trespi-Treci) where i is the number of times the ticket was rallied from the user to the ticket resolution practitioner or the like, and Treci is the time which the ticket was received in the rally i, and Trespi is the time the ticket was responded in the rally i. Severity is defined by ranking of the ticket for urgency to solve the ticket. In one aspect, the terms of a given SLA may define the criteria for criticality of each item. The criticality calculator 208 computes the criticality for tickets so that the tickets meeting a threshold criticality can be selected for clustering.

A cluster matching module 212 may update cluster information and its scores based on, e.g., ticket category and sub-category matching, and/or ticket description matching. The cluster matching module 212 may utilize the facet data matching and text data clustering algorithms described above with reference to FIG. 1. In addition, the cluster matching module 212 may update the FAQ Network database (DB) 214 with ticket information. If the cluster is a singleton, cluster matching module 212 may create a broken link in FAQ Network DB 214 and add the criticality of each broken branch. The cluster matching module 212 matches and updates the ticket cluster with the FAQ network.

Figure 3:
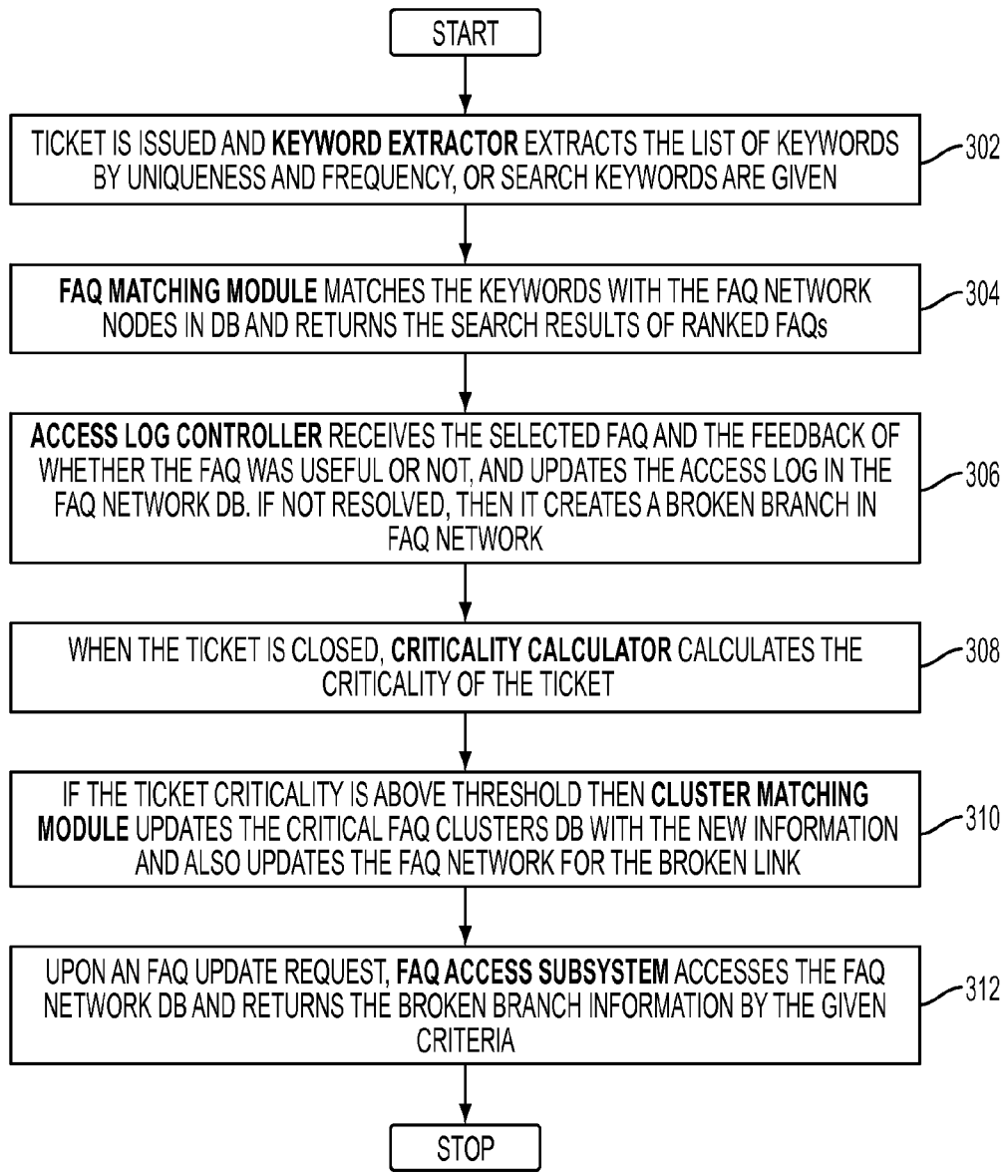
FIG. 3 is a flow diagram illustrating FAQ authoring and use method in one embodiment of the present disclosure.

FIG. 3 is a flow diagram illustrating FAQ authoring and use method in one embodiment of the present disclosure. At 302, a keyword extractor module (e.g., FIG. 2, 202) may receive a ticket and extract a list of keywords by uniqueness and frequency. In another embodiment, search keywords may be given (for example, shown at 218 in FIG. 2). At 304, an FAQ matching module (e.g., FIG. 2, 204) matches the keywords with the FAQ Network nodes in DB (e.g., FIG. 2, 214) and returns the search results of ranked FAQs. In one aspect, the rank/score is kept on a node level. Using, or based on the returned ranked FAQ or FAQs, a user such as a practitioner may find an answer or resolution to the ticket, a user such as an SME may edit the FAQ(s) that may have a broken branch that needs to be updated.

At 306, an access log controller module (e.g., FIG. 2, 206) receives the selected FAQ and the feedback of whether the FAQ was useful or not, and updates the access log in the FAQ Network DB (e.g., FIG. 2, 214). If not resolved, then the access log controller module 206 creates a broken branch in FAQ network. For example, practitioners or the like may use the FAQ, for instance, by selecting node branches or inputting keywords. They may use the FAQ to retrieve an answer to the ticket that has been assigned. When the answer has been successfully retrieved then they can rate the FAQ path to be "useful" to the system, and if not they can provide a feedback to the system that it is "not useful."

At 308, when the ticket is closed, the criticality calculator module (e.g., FIG. 2, 208) calculates the criticality of the ticket. For instance, tickets may be closed but that does not necessarily mean that FAQ is in sync. A methodology of the present disclosure identifies FAQ(s) in an FAQ network that correspond to the closed tickets so that the FAQ(s) can be updated and the FAQ network be synchronized with the resolution of the tickets.

At 310, if the ticket criticality is above a threshold, the cluster matching module (e.g., FIG. 2, 212) updates a critical FAQ clusters DB (e.g., FIG. 2, 216) with the new information and also updates the FAQ network for the broken link. The critical FAQ clusters DB may keep the tickets which may not be covered by FAQ, e.g., by cluster (group of tickets) and associated criticality.

Figure 6:
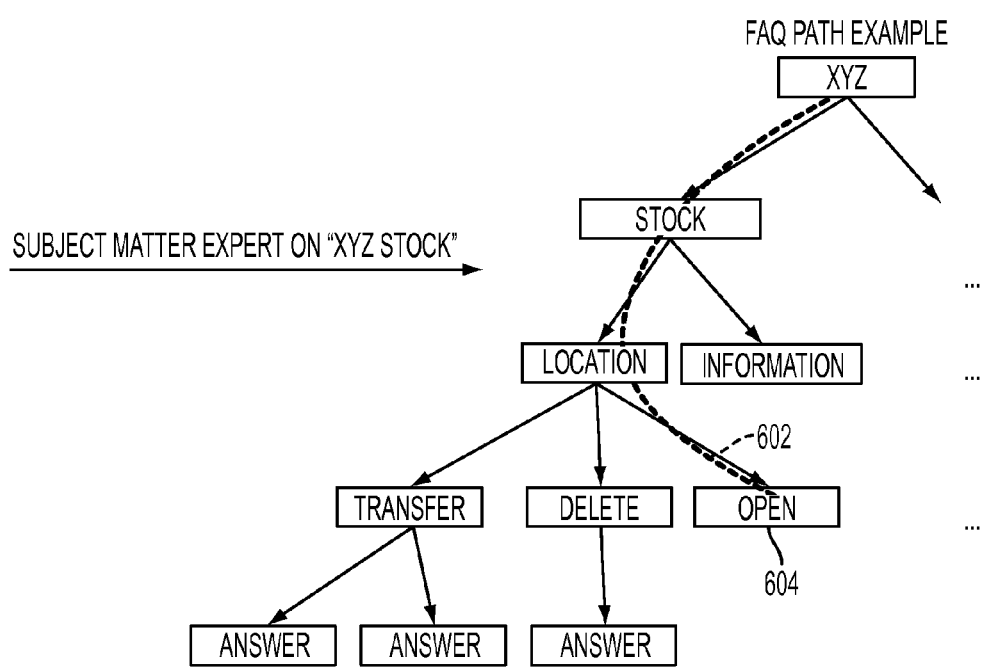
FIG. 6 illustrates an example flow of updating FAQs by criticality in one embodiment of the present disclosure.

At 312, in response to receiving an FAQ update request, an FAQ access subsystem (e.g., FIG. 2, 210) accesses the FAQ Network DB (e.g., FIG. 2, 214) and returns the broken branch information by the given criteria. An SME or the like when they are ready to update an FAQ, may access the system, e.g., in the form of an "update request." In another aspect, the system may alert the SME, e.g., by sending an email or another notification. The system returns the broken branch that corresponds to the SME's expertise area ("the given criteria"). Example of a broken branch is shown in FIG. 6, where there is no answer node to the branch. A methodology of the present disclosure in one embodiment automatically matches the FAQ which needs to be updated by matching with SME's profile.

Figure 4:
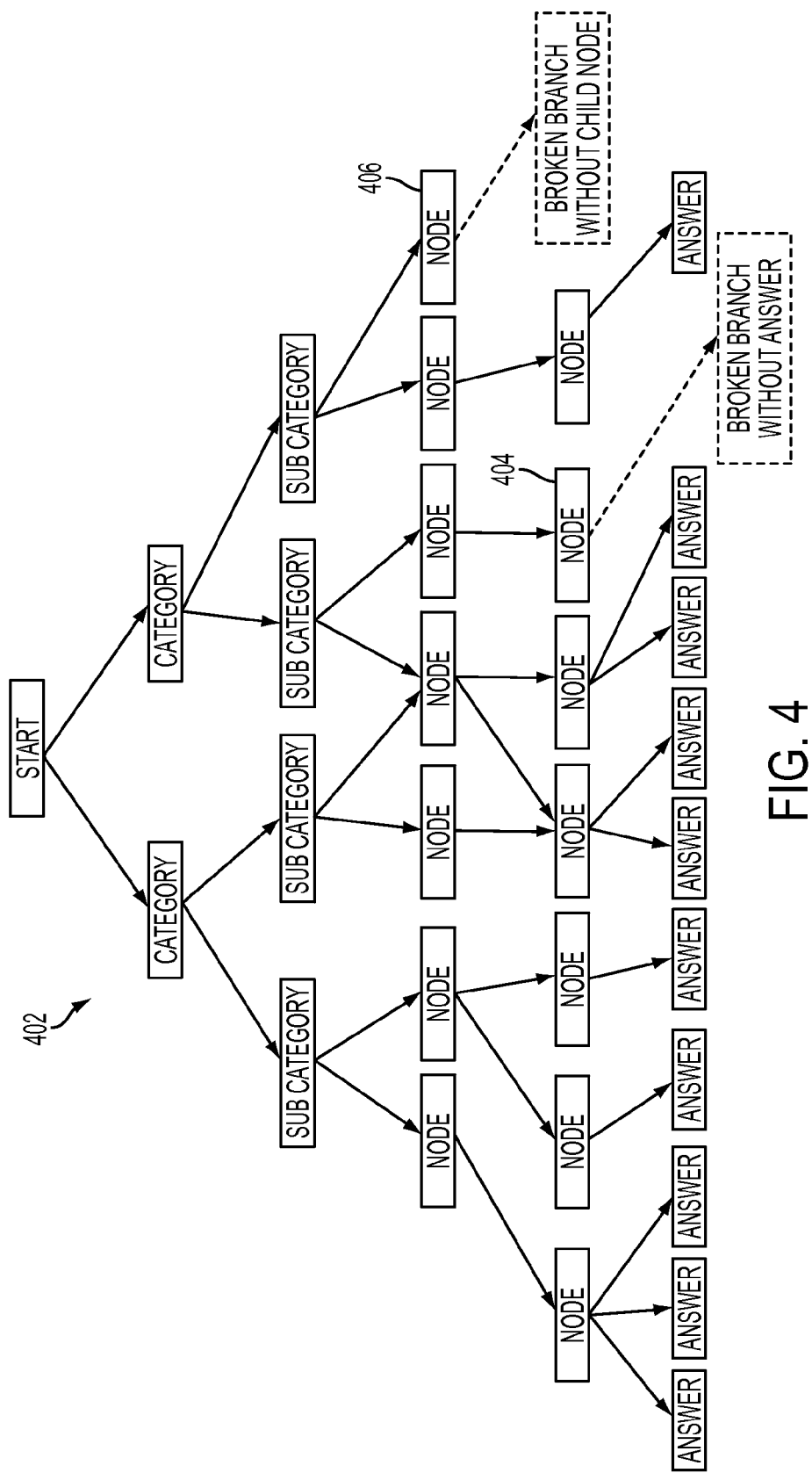
FIG. 4 illustrates an example FAQ network in one embodiment of the present disclosure.

FIG. 4 illustrates an example FAQ network in one embodiment of the present disclosure. The ticket resolution assistant system of the present disclosure in one embodiment utilizes a network structure of authored content (FAQs), i.e., "FAQ network." A FAQ network 402 may not cover all incidents, and includes "broken branches" 404, 406, where no child node/answer is defined yet. As the FAQ network 402 matures, broken branches are filled, incrementally and collaboratively.

Figure 5:
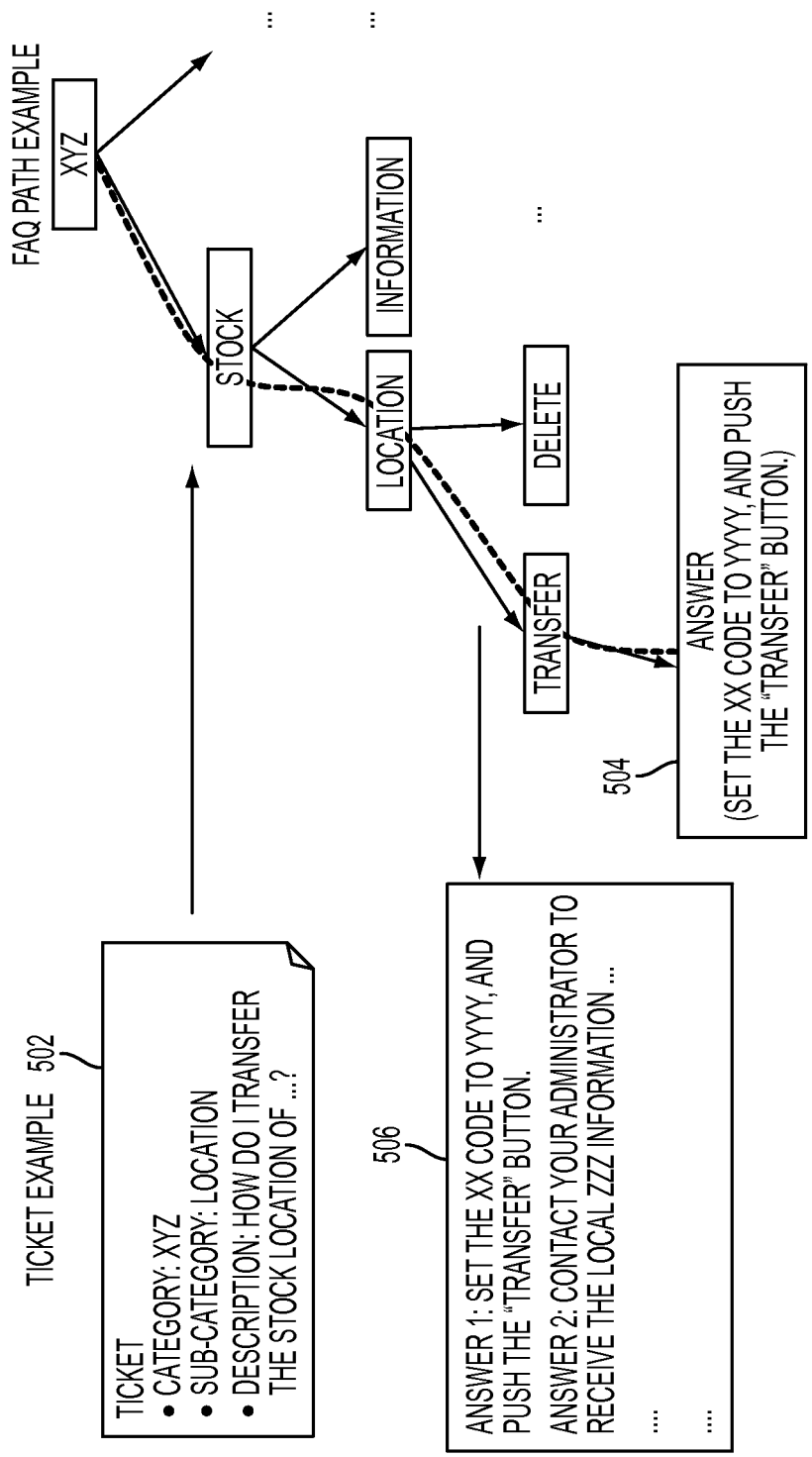
FIG. 5 illustrates an example flow of providing answers to ticket queries in one embodiment of the present disclosure.

FIG. 5 illustrates an example flow of providing answers to ticket queries in one embodiment of the present disclosure. In one aspect, the number of issued tickets may be reduced by relating search keywords with FAQ path (e.g., shown by dotted line). Time to resolution (TTR) of tickets can be reduced with the FAQ system fully automated. The example ticket 502, for example, includes keywords "XYZ" for category, "location" for sub-category, and "How do I transfer the stock location of . . . ?" for description. The keywords may be traced in the FAQ network, and an answer may be found at the end of the path as shown at 504. The located answer 504 in the FAQ path may be presented via a user interface, for example, as shown at 506.

FIG. 6 illustrates an example flow of updating FAQs by criticality in one embodiment of the present disclosure. For instance, SMEs can update FAQs quickly because the SME does not need to investigate the entire FAQ network, rather only the broken branch which is returned from the system of the present disclosure may be updated. FAQ criticality is stored in one embodiment in the critical FAQ clusters DB. The profile for an SME is defined as "XYZ stock" and there is a broken branch "open" under "XYZ" "stock" "location". The system of the present disclosure can match the "XYZ stock location open" path 602 with the SME's profile. The SME may update the returned node ("open") 604 and create answers based on the resolved ticket information. In one aspect, the order of questions may be changed based on criticality. In the example shown, the order of FAQ is shown as XYZ, stock, location and open.

FIG. 7A shows an example data model (data structure or an object or the like) representing a ticket. A problem or incident ticket, for example, may include attributes such as an identifier (ID), severity, category, sub-category, description, time to respond, and others, that convey information about the problem or incident. FIG. 7B shows an example data model representing an FAQ network. The FAQ network data model (data structure or an object or the like) may include attributes such as FAQ nodes, criticality of broken branch and associated tickets, access information associated with each node path, feedback information associated with each node path, and others. FIG. 7C shows an example data model representing critical FAQ clusters. The critical FAQ clusters data model (data structure or an object or the like) may include attributes such as cluster information of tickets, scores associated with each cluster, and others.

Figure 8:
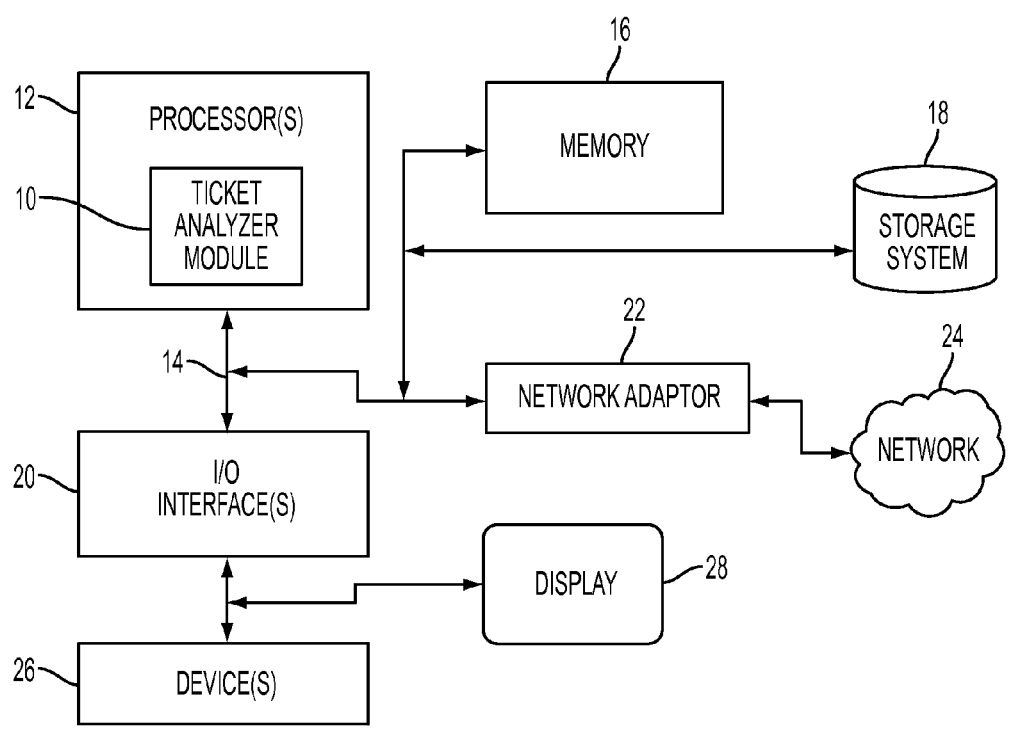
FIG. 8 illustrates a schematic of an example computer or processing system that may implement the system in one embodiment of the present disclosure.

FIG. 8 illustrates a schematic of an example computer or processing system that may implement the system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 8 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a ticket analyzer module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for building, reusing and calibrating network of authored content, comprising:
   receiving a plurality of problem tickets;
   clustering, by a processor, the plurality of problem tickets into one or more clusters;
   associating, by the processor, the one or more clusters to one or more FAQ nodes in a FAQ network;
   determining, by the processor, whether the one or more FAQ nodes is part of a broken branch; and
   notifying a user of the broken branch.

2. The method of claim 1, further comprising:
   receiving an answer corresponding to the one or more FAQ nodes; and
   updating the broken branch with the answer.

3. The method of claim 1, wherein the clustering of the plurality of problem tickets into one or more clusters comprises:
   performing facet data matching among a plurality of attributes associated with the problem tickets;
   clustering by text data analysis among the problem tickets whose facet data matched; and
   performing trend analysis on the clusters of tickets clustered by the text data analysis.

4. The method of claim 3, wherein the performing facet data matching, clustering by text data analysis, and performing trend analysis are processed in parallel.

5. The method of claim 1, wherein the associating the one or more clusters comprises scoring the one or more clusters and associating the one or more clusters to the one or more FAQ nodes in the FAQ network according to the scoring.

6. The method of claim 1, further comprising computing criticality of the one or more clusters, and the associating the one or more clusters comprises associating the one or more clusters that meet a threshold of criticality to the one or more FAQ nodes.

7. The method of claim 1, further comprising:
   receiving a list of keywords;
   matching the keywords with one or more nodes of the FAQ network;
   determining a paths of the nodes in the FAQ network; and
   returning the determined paths.

8. The method of claim 1, further comprising:
   receiving an update request from a user;
   identifying an expertise area of the user;
   searching the FAQ network for an FAQ node containing an FAQ associated with the expertise area of the user; and
   returning the FAQ to the user.

9. A system for building, reusing and calibrating network of authored content, comprising:
   a computer processor;
   a ticket analyzer operable to execute on the computer processor and further operable to determine frequently asked question candidates as content for authoring from a problem ticket description associated with an information technology system, the ticket analyzer further operable to progressively refine and refactor an FAQ network comprising the determined frequently asked question candidates as nodes in the FAQ network, the ticket analyzer further operable to provide a broken branch, manage FAQ network with criticality of broken branch and associated tickets;
   an authoring system for allowing one or more users to author answers to the frequently asked question candidates; and
   an authored content user portal operable to allow the one or more users to locate frequently asked questions in the FAQ network to solve a problem.

10. The system of claim 9, wherein the ticket analyzer further comprises a FAQ matching module operable to obtain strongest paths of FAQ.

11. The system of claim 10, wherein the ticket analyzer further comprises a criticality calculator operable to calculate the criticality of the ticket.

12. The system of claim 11, wherein the ticket analyzer further comprises a cluster matching module operable to update cluster information and its scores and also update the FAQ network with ticket information.

13. A non-transitory computer readable storage medium storing a program of instructions executable by a machine to perform a method of building, reusing and calibrating network of authored content, comprising:
   receiving a plurality of problem tickets;
   clustering the plurality of problem tickets into one or more clusters;
   associating the one or more clusters to one or more FAQ nodes in a FAQ network;
   determining whether the one or more FAQ nodes is part of a broken branch; and
   notifying a user of the broken branch.

14. The non-transitory computer readable storage medium of claim 13, further comprising:
   receiving an answer corresponding to the one or more FAQ nodes; and
   updating the broken branch with the answer.

15. The non-transitory computer readable storage medium of claim 13, wherein the clustering of the plurality of problem tickets into one or more clusters comprises:
   performing facet data matching among a plurality of attributes associated with the problem tickets;
   clustering by text data analysis among the problem tickets whose facet data matched; and
   performing trend analysis on the clusters of tickets clustered by the text data analysis.

16. The non-transitory computer readable storage medium of claim 13, wherein the associating the one or more clusters comprises scoring the one or more clusters and associating the one or more clusters to the one or more FAQ nodes in the FAQ network according to the scoring.

17. The non-transitory computer readable storage medium of claim 13, further comprising computing criticality of the one or more clusters, and the associating the one or more clusters comprises associating the one or more clusters that meet a threshold of criticality to the one or more FAQ nodes.

18. The non-transitory computer readable storage medium of claim 13, further comprising:
    receiving a list of keywords;
    matching the keywords with one or more nodes of the FAQ network;
    determining a paths of the nodes in the FAQ network; and
    returning the determined paths.

19. The non-transitory computer readable storage medium of claim 13, further comprising:
    receiving an update request from a user;
    identifying an expertise area of the user;
    searching the FAQ network for an FAQ node containing an FAQ associated with the expertise area of the user; and
    returning the FAQ to the user.

* * * * *